UNITED STATES PATENT OFFICE.

HARRY CROSS HUBBELL, OF NEWARK, NEW JERSEY.

METHOD OF MAKING STORAGE-BATTERY ELECTRODES.

1,104,898.　　　　Specification of Letters Patent.　　Patented July 28, 1914.

No Drawing.　　Application filed November 18, 1912.　Serial No. 732,146.

*To all whom it may concern:*

Be it known that I, HARRY CROSS HUBBELL, a citizen of the United States, residing at Newark, in the county of Essex and State of New Jersey, have invented a certain new and useful Improved Method of Making Storage-Battery Electrodes, of which the following is a specification.

My present invention relates to an improved method of making storage battery electrodes, especially those containing a mixture of active material and metal filaments for alkaline storage batteries.

I will describe my method in connection with a nickel active material and nickel filaments with the understanding that this is merely the preferred illustration and is not to be taken as a limitation of the broad invention to nickel, but on the contrary, the invention can be extended to other metals. For example, I take the precipitated green nickel hydroxid and filter it in a filter press. After washing the precipitate, I remove the damp cakes and knead them together to secure uniformity throughout the mass; and may do this in a mixing machine. Next, I analyze a sample therefrom to determine the amount of nickel hydroxid contained in the mass. Then I return the mass to the mixing machine and knead it with water into a slime, whereupon I add the desired proportion of filaments and further knead the mass. The fact that the filaments are incorporated with the active material when it is in the form of a slime makes it thoroughly and uniformly penetrate everywhere between and around the filaments. The preferred form of these filaments, ribbons or fibers, or, in general, conducting elements, is one to three inches long by one-thirty-second of an inch wide by about one-ten-thousandth of an inch thick; but other forms such as scales, might be used. The material is then dried down preferably over steam heat to a thick dough. It is then preferably again worked to further insure the uniformity of the mixture of the active material and filaments. Then the dough is put into a cylinder provided with a plunger which forces the dough through a slit out of the cylinder in the form of a long narrow ribbon, say three inches wide by one-eighth of an inch thick. This ribbon is received upon a traveling belt or tray beneath it and is cut up into pieces, say four inches long. Each of these pieces measures $3'' \times 4'' \times \frac{1}{8}''$, and after being dried by steam heat,—is then placed in the cavity of a similarly shaped die,—the plunger is then forced into the cavity to compress the tablet edgewise and bring it to a compressed dimension of say $3'' \times 1'' \times \frac{3}{16}''$. An important result of this operation is to turn most of the filaments edgewise to the face of the tablet so that the electrolytic action can all the more readily occur through the active material between the filaments.

Some of the further advantages of the new tablet are the following: I am able to dispense with the use of a binder to hold the fibers and active material together and which if used, renders the plate less dense when subsequently washed out. By making the nickel hydroxid or other equivalent active material act as its own binder, which I have discovered can only be done before it is dried, I produce a permanently compact tablet containing a larger proportion of active material so that the resulting plate has increased capacity for its size.

To make up the plate I prefer to assemble a plurality of these tablets edge to edge in a suitable metal container of any usual or preferred sort.

For the purposes of the process, it is essential that the active material be precipitated; meaning thereby that it shall be formed in some wet way either by actual chemical precipitation by mixing a precipitating reagent with a soluble salt of the metal, or perhaps by electrolytical precipitation or some other wet method. For example, to electrolytically form nickel active material, I may make a nickel plate the anode in an electrolytic cell, whereupon active oxygen compounds of nickel will be formed on the nickel plate and may be scraped off for use in my above process in making active material, but the precipitated active material, to make it act as its own binder, must be used in the process before it has been fully dried, as already pointed out above.

What I claim is:

1. The process of making storage battery electrodes which comprises taking precipitated active material, and without drying mixing it with suitable conducting elements; drying the mass to a thick dough; forming the dough into cakes, and drying and strongly compressing them.

2. The process of making storage battery electrodes which comprises taking precipitated active material, and without drying, mixing it with suitable conducting elements; drying the mass to a thick dough; forming the dough into cakes, drying said cakes and strongly compressing them edgewise.

3. The process of making storage battery electrodes which comprises taking precipitated active material, and without drying, kneading it into a slime with water; mixing said slime with suitable conducting elements; drying the mass to a thick dough; forming the dough into cakes, and drying and strongly compressing them.

In testimony whereof I affix my signature in presence of two witnesses.

HARRY CROSS HUBBELL.

Witnesses:
E. W. SCHERR, Jr.,
A. C. McDONNELL.